Dec. 27, 1932.　　　F. L. CHAPPELL　　　1,892,233
METHOD OF AND APPARATUS FOR DRYING CASEIN
Filed July 14, 1930　　2 Sheets-Sheet 1
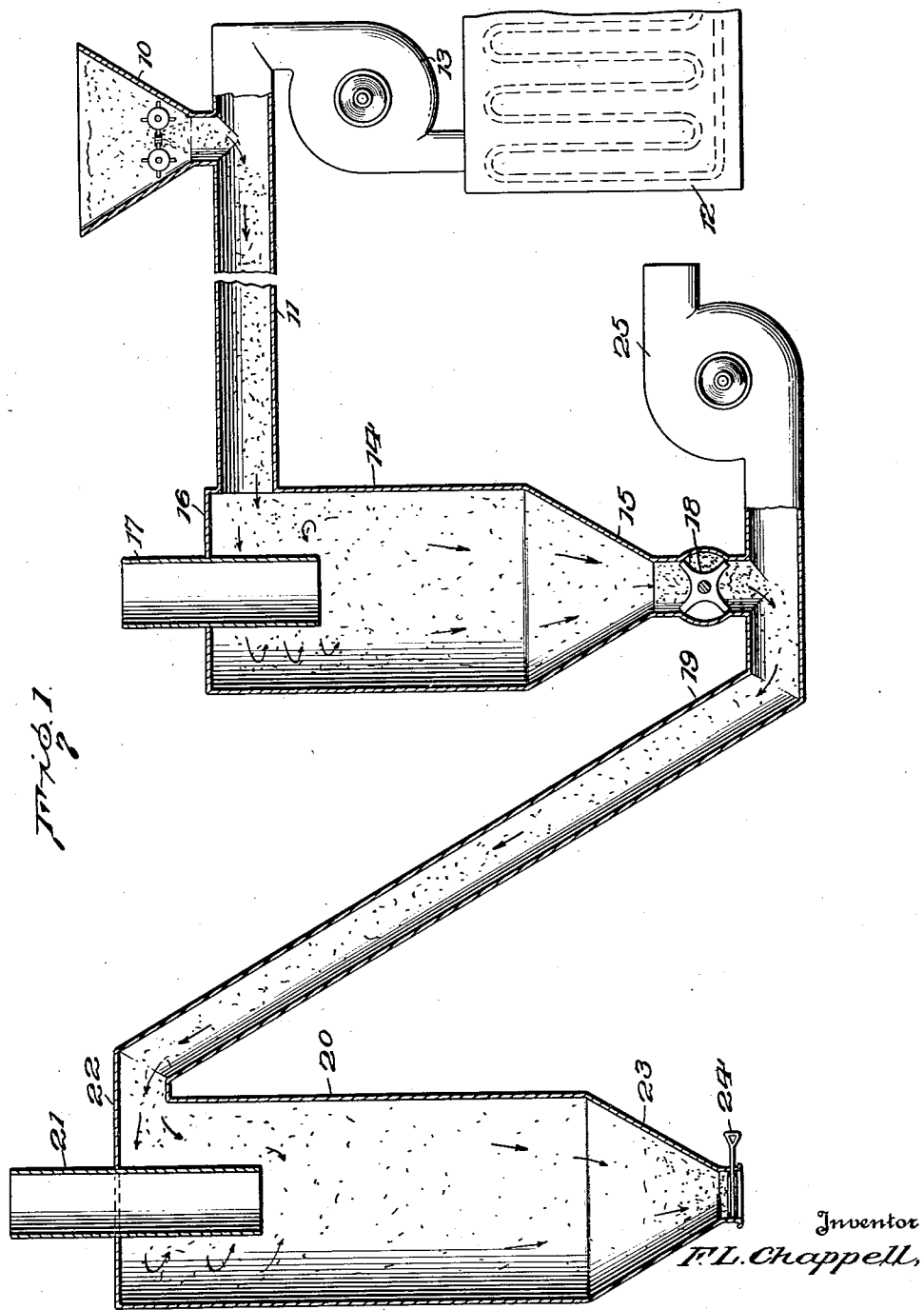
Inventor
F. L. Chappell,
By Church + Church
His Attorneys

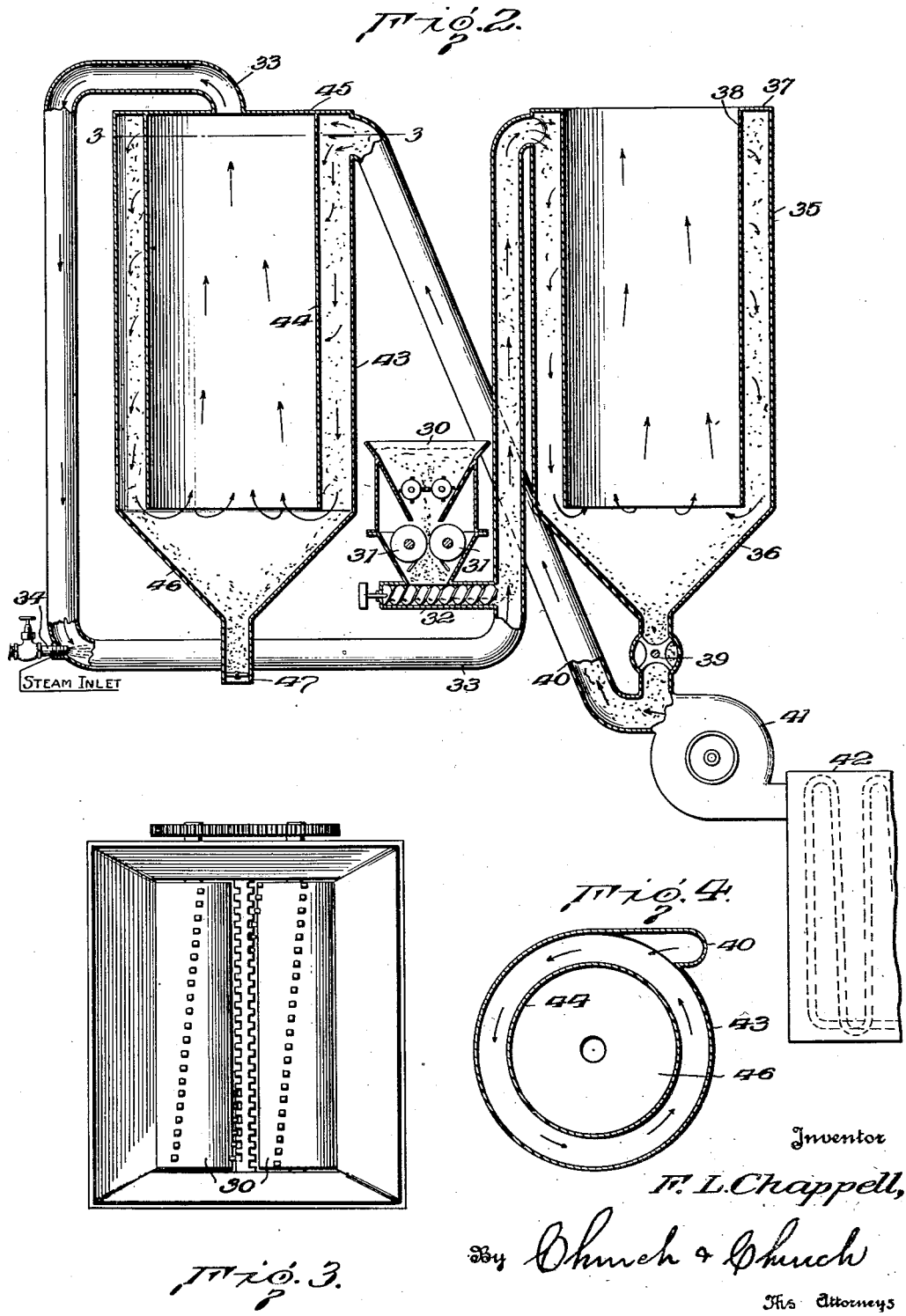

Patented Dec. 27, 1932

1,892,233

UNITED STATES PATENT OFFICE

FRANK LEWIS CHAPPELL, OF HOBART, NEW YORK

METHOD OF AND APPARATUS FOR DRYING CASEIN

Application filed July 14, 1930. Serial No. 467,922.

My invention relates to an improved method of and apparatus for drying casein and other solids having a tenacious moisture content, and has to do, more particularly, with the desiccation of pressed or otherwise partially dried casein curd by means of heated air.

The primary object of my invention is to provide a method and apparatus by which casein of even color, fineness, and dryness may be obtained, which will have greater purity, porosity, and solubility than that now being commercially produced.

Another object of my invention is to provide a method of drying casein which is more rapid than those heretofore used.

A further object of my invention is to provide an apparatus for drying casein which is practically automatic, is continuous in operation, which requires little or no cleaning or repair, and has a low initial cost.

A still further object of my invention is to provide an apparatus for drying casein which requires a minimum amount of air and has a high thermal efficiency.

Further objects, and objects relating to details and economies of operation, will definitely appear from the detailed description to follow. In one instance, I accomplish the objects of my invention by the means described in the following specification. My invention is clearly pointed out in the appended claims. My method and apparatus are illustrated, diagrammatically, in the accompanying drawings, forming a part of this specification, in which;

Figure 1 is a plan view of apparatus constituting a preferred embodiment of my invention, portions thereof being shown in section for the sake of clearness;

Fig. 2 is a plan view of a modified form of apparatus embodying my invention, portions thereof being shown in section;

Fig. 3 is a plan view of the curd mill used as a part of the apparatus shown in Fig. 2; and Fig. 4 is a horizontal sectional view on the line 3—3 through the final drying and separating chamber of the apparatus shown in Fig. 2.

In the drawings, the same reference numerals refer to the same parts throughout the several views.

At the present time, the most used and most successful method of extracting moisture from pressed casein curd employs the tray and tunnel type drier. According to this method, the pressed curd, containing as much as 50% moisture by weight, is passed through a grinder or chopper and is then spread upon shallow trays, usually constructed of wood and galvanized screening. The trays are stacked on trucks which are run into tunnels through which a current of air at a temperature of approximately 130° Fahrenheit is maintained for from three to eight hours. The dried casein is then generally reground to obtain a product of more uniform grain and appearance, and of lighter color, and in which condition a greater quantity may be packed in the same size bag and if unground.

There are several serious objections to the tray and tunnel type drier and its use for drying casein. It is expensive, in that it requires a great deal of manual labor, a great amount of precision in grinding the curd, maintaining an exact drying temperature, and a great amount of attention lest the product be overdried and "burned", or underdried, in which last case fermentation and mold growth are liable to set in. There is also a marked tendency toward coherence and lumping of the particles into case hardened masses, the centers of which are of high moisture content almost impossible of proper desiccation. In this condition, it is very difficult to determine when the product as a whole is dry and the fine particles thereof may be overdried or "burned". As casein comes from the trays, it will contain from 1% to 20% moisture by weight. This variation in the moisture content of one batch, and the absence of means for controlling it, is a serious defect in view of the fact that rennet coagulated casein should contain from 10 to 12% moisture and grain curd casein made with hydrochloric acid should contain from 6% to 8%. Regrinding of tray-dried casein is, therefore, essential to the production of casein of even grain, color and moisture content.

Another defect in the tray and tunnel type of drier arises from the fact that the trays are difficult of proper cleansing, especially if moldy casein adheres thereto. The trays, trucks and flooring are subject to wear, and particles of foreign material, nails, slivers of wood, pieces of metal, and dirt work their way into the product, impairing its purity and also frequently causing damage to the grinder or bolting cloth.

It is, therefore, a further object of my invention to provide a method and apparatus not subject to the objections and defects present in driers heretofore used for drying casein.

As in the case of the tray and tunnel type of drier, my invention applies to the drying of pressed or otherwise partially dried casein curd obtained from either skimmed milk or buttermilk by any of the known methods of treatment. In general, my invention consists in breaking up the partially dried curd into fine particles which will pass through a 10 to 20 mesh screen, that is, particles the size of bird shot, and injecting the particles into suspension in a body of heated air. More particularly, and in accordance with one preferred embodiment disclosed, my invention consists in passing the partially dried curd through a mill or chopper, feeding the casein particles into suspension in a current of air which has been heated to a temperature of from 200 to 350 degrees Fahrenheit, maintaining suspension until a greater part of the moisture has been extracted, precipitating the thus heated and partially dried casein, feeding said casein, while still hot, into suspension in a current of air at room temperature, maintaining said suspension until proper drying has been effected, and finally precipitating the properly dried casein.

In accordance with a somewhat modified embodiment, my invention consists, specifically, in grinding the curd, rolling the particles into flake form, feeding the flakes into suspension in a current of heated air which has been moistened to prevent too rapid drying of the particles, passing the air and suspended casein into an enlarged chamber where further drying and precipitation of the particles takes place, providing a current of hot dry air, feeding the partially dried casein into suspension in the hot dry air, and passing the air and suspended casein into a second enlarged chamber where drying of the casein is completed, and where the air is separated therefrom and led away into the first mentioned conduit to be moistened by water of evaporation from the casein and utilized for the initial drying operation.

Referring to the numbered parts of the drawings, my preferred apparatus, shown at Fig. 1, consists of a mill having chopping means 10 exerting a beating and shredding action by which the pressed or otherwise partially dried curd is comminuted, and fed into the conduit 11 through which air heated to a temperature of from 120 to 350 degrees Fahrenheit by the heater 12 is forced by the blower 13. The particles are picked up by the air and carried in suspension through the conduit, during which period extraction of the major portion of the moisture is effected. Employing, for example, air heated to 300 degrees Fahrenheit traveling at approximately 5 feet per second, it has been found that the major portion of the moisture content can be removed in from 30 to 60 seconds, depending upon various factors such as character and size of the casein particles, their moisture content and the humidity of the air. Accordingly, the required length for the conduit may be from 150 to 300 or more feet. The outlet end of the conduit 11 is tangentially connected to the upper portion of a substantially cylindrical collector chamber 14 into which the casein particles are discharged. By reason of the tangential relation of conduit to collector wall, the air and suspended particles of casein are given a whirling motion and due to the enlarged character of the chamber and resultant decrease in air velocity, the particles are precipitated to its bottom 15, which is preferably conical to facilitate discharge of the casein. Depending well into the chamber and attached to the top thereof by the annulus 16 is provided a cylindrical baffle section 17 evenly spaced from the outer wall of the chamber and through which the casein-free air is discharged. From the bottom of the chamber the hot and partially desiccated casein is fed by the revolving pocketed feeding device 18 into the conduit 19 through which air at room temperature is forced by blower 25. Here the casein is again in suspension and in cooling dries further to become casein having the desired moisture content, which varies for casein obtained by different processes. The conduit 19 is of such length as, in general, to provide 20 seconds of suspension, and discharges into a collector 20 similar to the first, having a baffle 21 supported by an annular member 22. The exhaust air passes through the baffle 21 and the casein is held in storage by the conical bottom 23 having a sliding gate 24 by which discharge into bags for shipment is controlled.

Referring to the numbered parts of the modified apparatus shown in Figs. 2 to 4 of the drawings, there is provided a mill having chopping means 30, exerting a beating and shredding action by which the pressed or otherwise partially dried curd is comminuted, a pair of rollers 31 which roll the particles into flake form, and a worm feed 32 by which the flakes are conveyed and fed into the conduit 33 through which a current of moist heated air is passing. The flakes are picked up by the air and carried in suspension through the conduit, during which period partial extraction of moisture is effected. By means of a valve controlled steam jet 34, the rate of moisture evaporation from the particles may be adequately controlled, preventing too rapid drying of the external surfaces thereof and their possible case hardening. The conduit 33 is tangentially connected to the upper portion of a substantially cylindrical enlarged chamber 35 which is in effect a continuation of the conduit since drying takes place in both conduit and chamber. By reason of this tangential relation of conduit to chamber wall, the air and suspended particles of casein are given a whirling motion, and due to the enlarged character of the chamber and the resultant decrease in air velocity, the particles are precipitated to the bottom 36 of the chamber which is preferably conical to facilitate discharge of the casein. Depending well into the chamber and attached to the top thereof by the annulus 37 is provided a cylindrical baffle section 38 evenly spaced from the outer wall 35 of the chamber, and through which the casein-free air is discharged. Because of the injected steam and the only partially dehydrated character of the particles, no casein loss is experienced by reason of continued suspension of casein as dust in the discharged air. However, should it be deemed essential or desirable, further casein collection means such as a filter or screen of cloth may be provided.

From the bottom 36 of the chamber, the precipitated and partially dried casein is fed by means of a revolving pocketed feeding device 39 into a second conduit 40 in which a current of hot dry air is provided by means of a blower 41 and an air heater 42. As shown in Fig. 4, this second conduit is also tangentially connected to a second chamber 43 similar to the first except for the fact that the air from which the casein has been precipitated is not discharged directly into the outside atmosphere, but is led into the first conduit 33 for use in the initial drying step. This use of the air exhausted from the second chamber not only effects a great saving in fuel by reason of utilization of its residual heat, but, because of its moisture content absorbed from the casein during desiccation, and its somewhat lower temperature, it is admirably suited for use in the initial drying of the curd particles. As is shown, the second chamber 43 is provided with a baffle 44 similar to that employed in the first chamber, and a cover plate 45 connected to the conduit 33. A conical bottom 46 is also provided, and depends into a valved neck 47 from which the properly dried casein is discharged.

It will be observed that I have provided a novel apparatus for drying casein curd, which has a high thermal efficiency, requires a minimum amount of manual labor and attention, is continuous in operation, may be easily regulated for drying various types of curd, and requires little or no cleaning and repair. The dry product obtained is of uniform grain, color, and moisture content, and is free from foreign material such as splinters, pieces of metal, and dirt frequently found in the casein dried by other apparatus and methods. If the comminuted curd is flaked previous to desiccation, a casein of even higher porosity and improved solubility will be obtained. No tendency toward case hardening, due to too rapid drying, is encountered. The injection of the small amount of steam and the discharge of the exhaust air from the first chamber, where the particles are still laden with considerable moisture, is effective against the loss of casein in the form of suspended dust. Because desiccation takes place rapidly and with but little interruption, fermentation and the formation of mold are prevented, thus eliminating difficult cleaning operations and improving the quality of the product.

While I have disclosed a system employing two drying and collecting chambers, my invention contemplates the use of a single chamber or a plurality thereof. Similarly, the size and length of the conduits, and the height and diameter of the chambers is to be determined by the space available and the quantity and character of the product to be handled.

A further refinement consists in the installation of automatic temperature, air, steam, and curd feed control apparatus rendering the entire system automatic. Such control apparatus is now available on the market and its installation is a matter only of engineering computation and mechanics. While my invention has been described as particularly applicable to the dehydration of casein curd, I contemplate its employment for the desiccation of other similar solids having a high and tenacious moisture content. I am also aware that numerous changes and refinements may be made in the method and apparatus herein disclosed without departing from the spirit of my invention. I, therefore, claim my invention broadly as indicated by the appended claims.

What I claim is:

1. The method of curing pressed casein curd which comprises chopping the pressed curd into particles the size of bird shot, heating a body of air to a temperature between 120 and 350 degrees Fahrenheit, injecting the chopped pressed curd into dispersed suspension in said heated air body, continuing suspension of said curd particles until properly cured, and collecting the cured casein in its finely divided form.

2. The method of curing pressed casein curd which comprises creating a current of air in a conduit, heating the air to a temperature between 120 and 350 degrees Fahrenheit, chopping the pressed curd into particles the size of bird shot, injecting the chopped pressed curd into dispersed suspension in said heated current of air, continuing suspension of said curd particles until properly cured, and collecting the cured casein in its finely divided form.

3. The method of curing pressed casein curd which comprises providing a current of air having a temperature between 120 and 350 degrees Fahrenheit, chopping the pressed casein curd into particles the size of bird shot, feeding the chopped curd particles into dispersed suspension in the current of hot air, precipitating the particles when their moisture content has been substantially reduced, providing a current of cooler air, feeding the precipitated partially cured particles, while still hot, into dispersed suspension in said current of cooler air, continuing said suspension until the particles have been properly cured, and finally precipitating the casein particles from said last mentioned current of air in a cool and properly cured state.

4. The method of curing pressed casein curd which comprises providing a current of heated air, injecting steam into said air current, chopping the pressed curd into particles the size of bird shot, feeding the chopped curd particles into dispersed suspension in the current of air, collecting the partially cured casein particles from the air, providing a current of hot dry air having a temperature between 120 and 350 degrees Fahrenheit, feeding the collected, partially cured casein particles into dispersed suspension in said hot dry air, maintaining said suspension in said hot dry air until the particles have been properly cured, and finally collecting the casein particles from the hot air in their properly cured, finely divided state.

5. The method of curing casein curd which comprises heating a body of air to a temperature between 120 and 350 degrees Fahrenheit, finely dividing the curd into small particles, rolling the particles into thin flakes, injecting the flaked curd particles into dispersed suspension in said heated air body, and collecting the thus cured casein in flake form.

6. The method of curing casein curd which comprises creating a current of air in a conduit, heating the air to a temperature between 120 and 350 degrees Fahrenheit, finely dividing the curd into small particles, rolling the particles into thin flakes, feeding the flaked curd into dispersed suspension in said heated current of air, and collecting the thus cured casein in flake form.

7. The method of curing casein curd which comprises providing a current of heated air, injecting moisture into said air current, finely dividing the curd into small particles, rolling the particles into thin flakes, feeding the flaked curd into dispersed suspension in the current of air, collecting the thus processed casein flakes from the air, providing a current of hot dry air having a temperature between 120 and 350 degrees Fahrenheit, feeding the collected casein flakes into dispersed suspension in said dry air, and collecting the cured casein flakes from the dry air.

FRANK LEWIS CHAPPELL.